(12) United States Patent
El Baraka et al.

(10) Patent No.: US 10,008,891 B2
(45) Date of Patent: Jun. 26, 2018

(54) ROTOR WITH PERMANENT MAGNETS

(71) Applicant: VALEO EQUIPEMENTS ELECTRIQUES MOTEUR, Creteil (FR)

(72) Inventors: Khadija El Baraka, Bussy St Georges (FR); Svetislav Jugovic, Juvisy-sur-Orge (FR); Frederic Palleschi, Thiais (FR); Jerome Legranger, Creteil (FR)

(73) Assignee: Valeo Equipements Electriques Moteur, Creteil (FR)

( * ) Notice: Subject to any disclaimer, the term of this patent is extended or adjusted under 35 U.S.C. 154(b) by 362 days.

(21) Appl. No.: 14/905,846

(22) PCT Filed: Jul. 16, 2014

(86) PCT No.: PCT/FR2014/051827
§ 371 (c)(1),
(2) Date: Jan. 18, 2016

(87) PCT Pub. No.: WO2015/015084
PCT Pub. Date: Feb. 5, 2015

(65) Prior Publication Data
US 2016/0172916 A1    Jun. 16, 2016

(30) Foreign Application Priority Data

Jul. 29, 2013 (FR) ..................... 13 57484

(51) Int. Cl.
*H02K 21/12*    (2006.01)
*H02K 1/27*    (2006.01)

(52) U.S. Cl.
CPC ......... *H02K 1/2753* (2013.01); *H02K 1/2773* (2013.01); *H02K 2213/03* (2013.01)

(58) Field of Classification Search
CPC ..................................... H02K 1/276
(Continued)

(56) References Cited

U.S. PATENT DOCUMENTS

| 7,772,735 B2 * | 8/2010 | Nishiura | H02K 1/2773 |
| | | | 310/156.36 |
| 8,505,674 B2 * | 8/2013 | Neubauer | B62D 5/0403 |
| | | | 180/443 |

(Continued)

FOREIGN PATENT DOCUMENTS

| CN | 201656606 U | 11/2010 |
| CN | 201994809 U | 9/2011 |

(Continued)

*Primary Examiner* — Alexander Talpalatski
(74) *Attorney, Agent, or Firm* — Berenato & White, LLC

(57) ABSTRACT

A rotor with permanent magnets comprising: a stack of laminations forming the core of the rotor having an axis, housings spaced evenly apart on the circumference of the rotor and located in the core of the rotor, some of which receive at least one element in the form of a permanent magnet held radially and axially inside the housing between an inner axial part of the housing and an outer axial part, the inner axial part of the housing comprising two concave portions and a protruding portion extending axially according to the axis, the protruding portion being radially closer to the inner axial face of the magnet than the two concave portions. Moreover, recesses are provided in the core and positioned between the housings on a trajectory successively linking the protruding portions of consecutive housings.

20 Claims, 2 Drawing Sheets

(58) Field of Classification Search
USPC .................... 310/156.53, 156.57, 156.38
See application file for complete search history.

(56) References Cited

U.S. PATENT DOCUMENTS

| | | | | |
|---|---|---|---|---|
| 8,508,094 | B2* | 8/2013 | Matt | ............... H02K 21/14 |
| | | | | 310/156.57 |
| 8,669,682 | B2* | 3/2014 | Matt | ............... H02K 1/2773 |
| | | | | 310/156.53 |
| 8,896,177 | B2* | 11/2014 | Kim | ............... H02K 1/276 |
| | | | | 29/598 |
| 9,065,314 | B2* | 6/2015 | Arimatsu | ............... H02K 1/276 |
| 9,130,423 | B2* | 9/2015 | Uchitani | ............... H02K 1/274 |
| 2007/0252469 | A1 | 11/2007 | Nishiura et al. | |
| 2009/0295245 | A1 | 12/2009 | Abe et al. | |
| 2010/0001605 | A1* | 1/2010 | Tajima | ............... H02K 21/044 |
| | | | | 310/156.22 |
| 2012/0326548 | A1 | 12/2012 | Nonaka | |
| 2013/0119817 | A1* | 5/2013 | Arimatsu | ............... H02K 1/276 |
| | | | | 310/216.074 |
| 2013/0187506 | A1 | 7/2013 | Lee et al. | |

FOREIGN PATENT DOCUMENTS

| | | |
|---|---|---|
| CN | 202221930 U | 5/2012 |
| DE | 102007029719 | 8/2008 |
| DE | 102011080948 A1 | 2/2013 |
| EP | 0803962 | 10/1997 |
| EP | 0831580 | 3/1998 |
| EP | 1865200 | 12/2007 |
| EP | 2372872 | 10/2011 |
| EP | 2568578 | 3/2013 |
| FR | 2982439 A1 | 5/2013 |
| KR | 20120014883 | 2/2012 |
| WO | WO2013060960 | 5/2013 |
| WO | WO2013088010 | 6/2013 |
| WO | WO2013175117 A1 | 11/2013 |

* cited by examiner

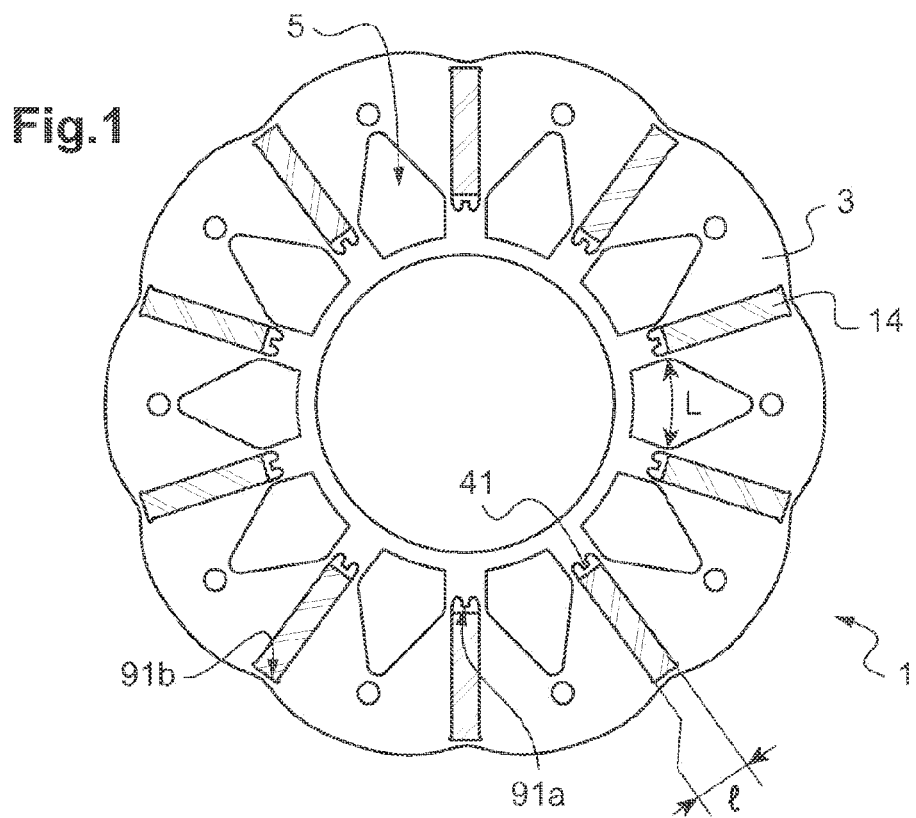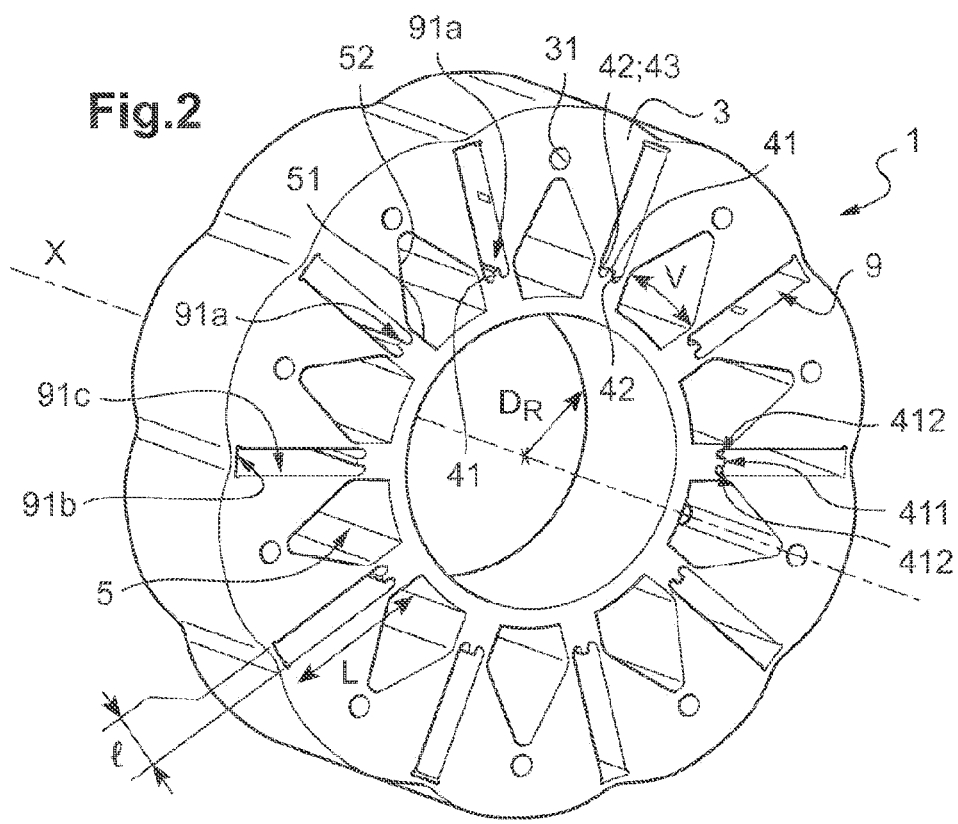

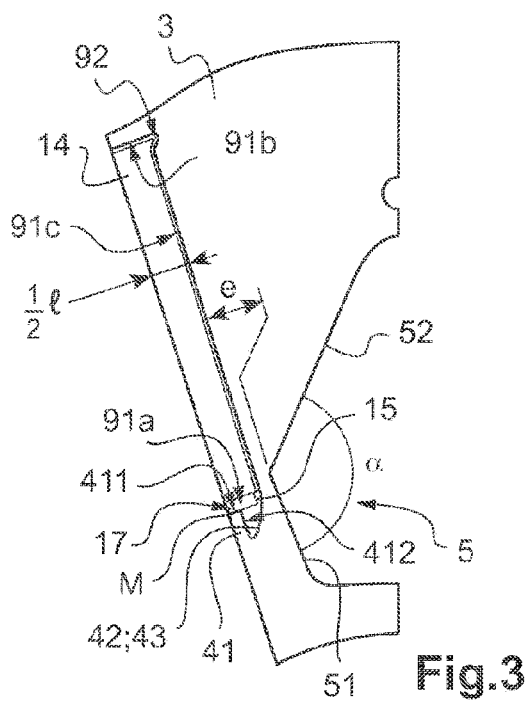
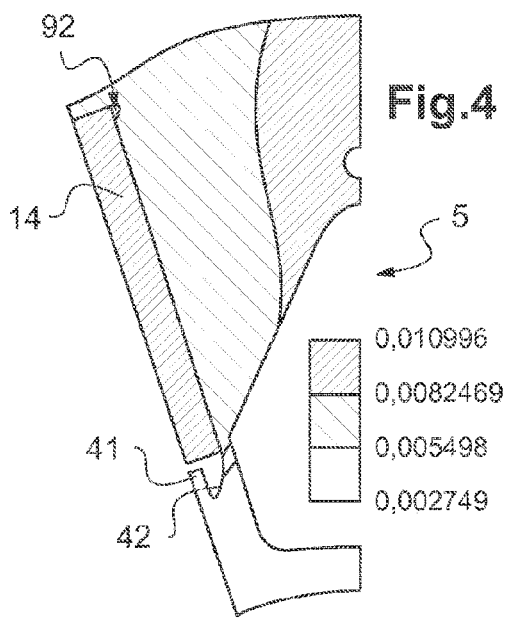
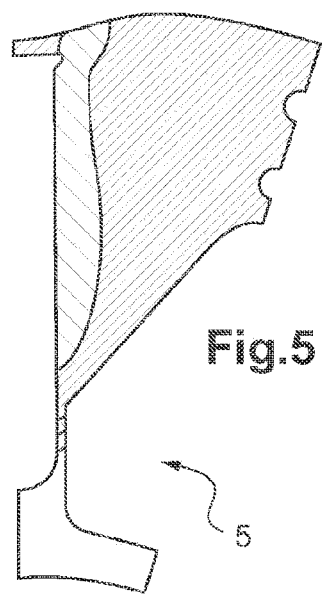
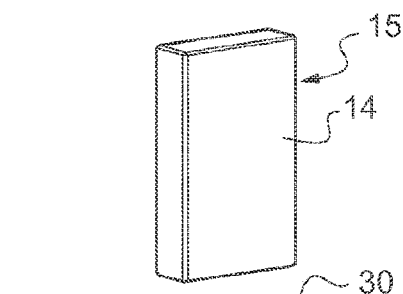
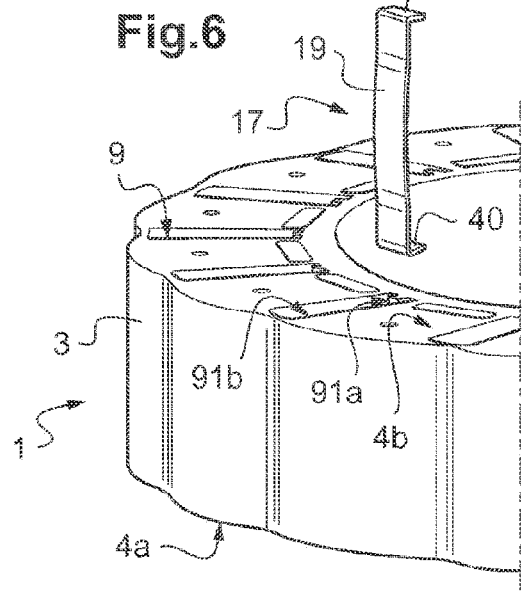

ROTOR WITH PERMANENT MAGNETS

CROSS-REFERENCE TO RELATED APPLICATIONS AND CLAIM TO PRIORITY

This application is a national stage application of International Application No. PCT/FR2014/051827 filed Jul. 16, 2014, which claims priority to French Patent Application No. 1357484 filed Jul. 29, 2013, the disclosures of which are incorporated herein by reference and to which priority is claimed.

FIELD OF THE INVENTION

The invention relates to a rotor for an electrical machine.

The invention has a particularly advantageous, but not exclusive application with alternators or current generators.

BACKGROUND OF THE INVENTION

Electrical machines are known comprising a stator and a rotor with permanent magnets which is integral with a shaft. The rotor can be integral with a drive shaft and/or a driven shaft, and can belong to a rotary electrical machine in the form of an alternator or current generator as described in document EP 0 803 962, or of an electric motor as described in document EP 0 831 580. The shaft can ensure that a spiral compressor, also known as a scroll compressor, is put into motion. A system of this type comprises two interposed spirals such as vanes in order to pump and compress the coolant fluid. In general, one of the spirals is fixed, whereas the other is displaced eccentrically without rotating, such as to pump, then trap, and finally compress pockets of fluid between the spirals. A system of this type is described for example in document EP 1 865 200. In all cases, the machine comprises a housing which supports the stator. This housing is configured to support the shaft in rotation, for example by means of bearings, such as ball bearings and/or needle bearings.

The rotor comprises a body made of laminated plate, which comprises receptacles. At least one permanent magnet is positioned inside some of the receptacles. Tolerances used in the production of the rotor exist which make it possible for the magnets to be badly placed inside the receptacles of the rotor; this can be disadvantageous taking into account the action of the centrifugal force to which the magnets can be subjected. Solutions have been developed in order to remedy this aspect.

Document CN202221930 describes a rotor with permanent magnets comprising:

a set of plates forming the body of the rotor with an axis;
receptacles which are spaced regularly around the circumference of the rotor, and situated in the body of the rotor, some of which receive at least one element in the form of a permanent magnet which is retained radially and axially inside the receptacle, between an inner axial part of the receptacle and an outer axial part, the said inner axial part of the receptacle comprising two concave portions and a projecting portion which extend axially according to the axis X, the said projecting portion being radially closer to an inner axial face of the magnet than the two concave portions.

In a rotor of this type, it has been found that part of the magnetic flux created by the winding of the rotor passed via leakage paths instead of being channelled into the body of the stator. These leakages of magnetic flux take place in the vicinity of the free ends of the magnets.

It has also been found that a rotor of this type has a plurality of major disadvantages. In particular, during the fitting of the magnet in its receptacle, it is essential to provide reduced geometric tolerances of the rotor and the receptacle, in order to retain the magnet axially; more specifically, the geometric tolerances relating to the axial retention of the magnet, such as those of the hooks of the receptacle and of the projecting portion, are particularly reduced. These geometric tolerances have a negative impact on the production costs; poor adjustments could mean that it is not possible to position the magnet correctly radially, or even that it is impossible to fit the magnet inside its receptacle.

SUMMARY OF THE INVENTION

In this context, the problem posed in this case is to reduce the magnetic flux leakage paths of the rotor, without having a negative impact on the mechanical strength of the rotor. In particular, one of the objectives in this case is to prevent concentrations of mechanical stress which can take place in the vicinity of the receptacle of the magnet from having a negative effect on the service life of the rotor as a result of its functioning. In particular, the aim is to propose a rotor with permanent magnets which is easy to produce, inexpensive, durable, and which has a compromise between prevention of the magnetic flux leakage paths and the mechanical strength of the body of the rotor.

The solution proposed by the present invention is that recesses are provided in the body, and positioned between the receptacles on a trajectory which connects in succession the projecting portions of the consecutive receptacles.

An arrangement of this type makes it possible to reduce the magnetic flux leakage paths. In fact, with recesses on the trajectory which connects two projecting portions, the thickness of the body between the recess and the receptacle is reduced. This narrow thickness of 1 mm for example forms a bottleneck for the magnetic leakages. This arrangement also makes possible sufficient mechanical strength.

According to one embodiment, the magnet is retained radially and axially by means of a retention device which extends axially inside the receptacle, between the inner axial part of the receptacle and the said axial face of the magnet. This retention device advantageously has a spring effect in order to retain the magnets when it is placed in one of the receptacles 9.

An arrangement of this type prevents untimely sliding of the magnet relative to its receptacle during functioning of the rotor with a high speed of rotation. In fact, the spring effect of the retention device makes it possible to apply an opposing force against the centrifugal force.

According to one embodiment, the concave portions have outer contours formed by lines in the form of an arc of a circle.

The lines in the form of an arc of a circle of the outer contours of the concave portions make it possible to refine progressively the thickness of material between the receptacle and the recess, and improve the mechanical strength of the body of the rotor, in particular in the vicinity of the receptacle and the recess.

It has been found that, the smaller the thickness between the receptacle and the recess, the fewer magnetic flux leakage paths there are, and the less the body of the rotor has good mechanical strength.

Thus, the arrangement which combines the radially projecting portion closer to the axial face of the magnet than the two concave portions, and the progressive refining of the thickness of the material between the receptacle and the recess via lines in the form of an arc of a circle make it possible to respond to these two problems, and provide a good compromise.

According to one embodiment, the projecting portion has a first facet with a middle M which defines the centre of the lines in the form of an arc of a circle.

According to one embodiment, the lines in the form of an arc of a circle of the outer contours of the concave portions have a common centre of a circle.

This makes it possible to facilitate the production of the rotor and to ensure homogenous distribution of the magnetic fluxes which pass through the rotor.

According to one embodiment, the centre of the circle is contained on a plane which passes via the axis X, and is contained radially in the receptacle.

According to one embodiment, the radius of curvature of the lines in the form of an arc of a circle is substantially equal to half a width of the receptacle.

This characteristic improves the symmetry of the receptacle, and thus the balancing of the rotor.

According to one embodiment, the recess has two first sides, each of these first sides extending substantially parallel to a radial face of the closest receptacle.

This makes it possible to strengthen the structure of the rotor by avoiding concentrations of stresses in the locations where the material contained between the radial face of the receptacle and the first sides of the receptacle defines a narrowing. This advantageously makes it possible to distribute the stresses homogenously.

According to one embodiment, the thickness contained between the radial face of a receptacle and the side of a following recess is thinned in order to limit the magnetic leakage paths.

According to one embodiment, the radial face of the magnet is substantially orthogonal to the first facet of the projecting portion.

Since the magnet is guided radially by the radial faces of the receptacle, this advantageously makes it possible to transfer the forces from the projecting portion to the magnet via the first facet; a larger part of the stresses is transferred radially to the magnet, which reduces the stresses between the recess and the receptacle of the magnet.

According to one embodiment, the trajectory is circular, and has as its centre the point O, the point O being at the intersection between the axis of the rotor and the section which intersects the axis X of the rotor perpendicularly.

According to one embodiment, the trajectory extends according to a maximum length of the recess. In particular, the trajectory which extends according to the maximum length of the recess is the length contained between two consecutive receptacles.

According to one embodiment, the recesses have a form which is obtained from the combination of a form in the shape of a triangle and form in the shape of a trapezium.

A form of this type provides a good compromise between the reduction of the magnetic leakage paths, a saving of material, and good mechanical strength of the rotor.

According to one embodiment, fourth sides of the form in the shape of a triangle adjacent to two first non-parallel sides of the form in the shape of a trapezium define an angle α of between 90° and 180° relative to the first sides which are respectively adjacent to them.

A range of values of angles of this type provides a good compromise between the reduction of the magnetic leakage paths, a saving of material, and good mechanical strength of the rotor.

According to one embodiment, a recessed portion which extends according to the axis X is provided at the intersection of a radial face of the receptacle and an outer axial part of the receptacle.

This recessed portion makes it possible to facilitate the incorporation of the magnet via an assembly gap. In the case when the magnet is secured in the receptacle by means of an adhesive, this permits leakage of adhesive towards this recessed portion. In another case, this recessed portion can make it possible to incorporate a blade (or strip) in order to improve the retention of the magnet in the receptacle.

According to one embodiment, the retention device has contact with the projecting portion along the entire receptacle, according to the axis X.

This contact makes it possible to regularise the transfer of forces from the projecting portion to the retention device.

According to one embodiment, the projecting portion is contained between first ridges which separate the projecting portion from the two concave portions, the said two concave portions being contained between these first ridges and second ridges which separate the concave portions from the radial faces of the receptacle.

According to one embodiment, along a section which intersects the axis X of the rotor perpendicularly, the first facet extends parallel to the retention device, and second and third facets which are parallel to one another are connected to the concave portion in the location of the said first ridges.

According to one embodiment, the receptacle has a contour which is closed according to a section which intersects the axis of the rotor perpendicularly.

According to one embodiment, the recesses are provided in the body, and are positioned between the receptacles along a trajectory which connects in succession the projecting portions of the consecutive receptacles, according to a section which intersects the axis of the rotor perpendicularly.

A second subject of the invention also relates to an alternator comprising a rotor according to a preceding embodiment.

BRIEF DESCRIPTION OF THE DRAWINGS

FIG. 1 shows a view from above of an embodiment of a rotor with permanent magnets according to the invention.

FIG. 2 shows a view in perspective of the embodiment of the rotor represented in FIG. 1.

FIG. 3 shows a partial view from above of the embodiment of the rotor shown in FIGS. 1 and 2.

FIG. 4 shows a view from above of the embodiment of the rotor with magnets similar to FIG. 3, in which the distribution of the stresses of the rotor body in the functioning state is represented, the distribution of the stresses being deduced from the displacements of material represented by different patterns.

FIG. 5 shows a view similar to that of FIG. 4, in which an embodiment of a rotor with magnets according to a prior art is represented.

FIG. 6 shows a view in perspective of the embodiment shown in FIG. 1, in which the magnet and the device for retention of the magnet are represented before they are incorporated in the receptacle.

Elements which are identical, similar or analogous retain the same reference from one figure to another.

DETAILED DESCRIPTION OF THE PREFERRED EMBODIMENT(S)

FIGS. 1, 2 show a rotor 1 according to the invention with an axis X, and a body 3 secured on a central hub (not represented) which is grooved on its inner periphery for securing in rotation on a shaft. The body 3 comprises receptacles 9 which are designed to receive permanent magnets 14 which are retained radially and axially by means of retention devices 17. More specifically, the rotor 1 is formed by a stack of plates which extend on a radial plane perpendicular to the axis X. The set of plates forms the body 3 of the rotor 1, and is made of ferromagnetic material. The plates of the body 3 are preferably retained by means of rivets which pass axially through the rotor 1 from one side to the other via openings 31.

Recesses 5 are provided in the body 3. According to a preferred embodiment, when seen from above (see FIG. 1), these recesses 5 have a form obtained from the combination of a form in the shape of a triangle and a form in the shape of a trapezium. The triangle has a common side with the large side of the trapezium. The recesses 5 make it possible to channel the magnetic flux well.

The body 3 also has receptacles 9, preferably with a substantially parallelepiped form, which are designed to receive permanent magnets 14. These receptacles 9 spaced regularly on the circumference of the rotor, and situated in the body 3 of the rotor 1, have a direction with longitudinal extension parallel to the axis X, and a direction of extension which extends substantially radially relative to the axis X. The receptacles 9 formed in the body 3 in this case preferably have a globally rectangular cross-section. Alternatively, the receptacle 9 opens out according to a section perpendicular to the axis X, and can permit the passage of the retention device 17; the section of this receptacle 9 is comparatively larger than the largest of the sections of the retention device 17 perpendicular to the axis X, on the understanding that during assembly, the retention device 17 would constitute a male part, and the passage would constitute the female part. Alternatively, the receptacles 9 can be closed at one of their axial ends.

FIG. 6 represents a retention device 17, a central part 19 of which exerts by deformation a radial force on the magnet 14 as well as on an inner axial part 91a of the receptacle 9. Outer axial part 91b and inner axial part 91a mean the faces which are oriented respectively radially towards the axis X of the rotor 1 and on the side opposite the axis X of the rotor 1. In other words, the inner axial part 91a faces towards the exterior of the rotor 1; the exterior of the rotor 1 is the radial wall of the rotor 1 which is furthest from the axis X, and the interior of the rotor 1 is the part of the rotor 1 which is relatively closest to the centre of the rotor 1.

The receptacles 9 are each designed to receive elements in the form of a magnet 14 or a plurality of permanent magnets 14 which are superimposed on one another according to one of their longitudinal faces, in order to obtain maximum power of the machine. The magnets 14 thus superimposed then form a column of magnetic elements with a form complementary to that of the receptacles 9. The magnets 14 can thus be stacked on one another according to a radial direction, in order to form a column of elements with a form complementary to that of the receptacles 9.

The magnets 14 can be made of rare earth, for example based on samarium-cobalt (SmCo), or based on neodymium-iron-boron (NdFeB) with high coercivity and a high level of remanence, as well as good resistance to temperature. They can also be made of ferrite. It is appreciated that the number of magnets depends on the applications, and in particular on the length of the body 3.

As a variant, it is possible to accommodate magnets 14 made of rare earth in some receptacles 9, and magnets made of ferrites in other receptacles 9, the number of which can be the same as, or less than, the number of rare earth magnets. Thus, it is possible to use costly rare earth magnets in order to approximate as well as possible for example a required electric power of the machine, and complete this with ferrite magnets which are less costly. The invention makes it possible to use permanent magnets with different grades in order to optimise the costs.

In addition, in some of the receptacles 9, it is possible to replace at least one of the magnets by a non-magnetic element, which for example is made of aluminium, and has the same form, in order to obtain the required power of the electrical machine. This therefore forms in the axial direction a column of elements which are stacked on one another, and have a form complementary to that of the receptacles.

Thus, all the receptacles 9 can contain a plurality of magnets 14 stacked according to the radial direction, optionally with the presence of at least one non-magnetic element. As a variant, at least two diametrically opposite receptacles 9 are empty. Because of the fact that the column of elements comprises at least a plurality of stacked magnets, it is easily possible to regulate the power of the rotary electrical machine, whilst retaining the same rotor.

In order to ensure good retention of the magnets 14 inside the receptacle 9, the rotor 1 can comprise retention devices 17 which are formed from an elongate metal strip, the width of which depends on that of the receptacle 9 into which this strip penetrates.

Thus, the example of a retention device 17 shown in FIG. 6 comprises a central part 19 which extends axially inside the receptacle 9, between an inner axial part 91a of the receptacle 9, and an inner axial face 15 of a magnet 14, this central part 19 having a form such that it exerts by deformation a radial force on the magnet 14 and on the inner axial part 91a. This central part 19 has a form such that it exerts by deformation, when it is compressed between the magnets 14 and the inner axial part 91a, a radial force on each magnet 14 of the receptacle 9, from the interior towards the exterior of the rotor 1.

As a result of the resilience of the retention device 17, the device can be assimilated to a spring, and more particularly a leaf spring, comprising a first, relaxation position, and a second, compression position. In the present case, when the retention device 17 and the magnet are fitted in the rotor 2, the spring is in its second, compression position.

According to the embodiment shown in FIG. 6, the retention device 17 also comprises first and second retention means 30 and 40. These first 30 and second 40 retention means are supported by the said central part 19 at each of its ends. In the location of the ends 20 of the central part 19, the retention device extends in order to form first and second retention means. The ends 20 of the central part 19 are situated axially opposite the axial ends of the inner axial part 91a; these axial ends are defined axially at the separation between the interior and the exterior of the receptacle 9. As shown in FIG. 6, the first 30 and second 40 retention means have forms in the shape of a hook with a curved part. Conventionally, the first and second retention means 30 and 40 thus supported by the said central part 19 have forms such that the said retention means 30 and 40 exert an axial force by deformation on respectively lower 4a and upper 4b faces of the body 3.

As is apparent from the description and the drawings, the retention device 17 is a resilient part in the form of a strip of material, which has a central part 19 and first 30 and second 40 resiliently deformable retention means in order to exert respectively a radial and axial force on the permanent magnets. The central part 19 with radial action makes it possible to conserve the magnets 14, since they are less sensitive to impacts and vibrations because of this central part 19. The first 30 and second 40 retention means with axial action also make it possible to conserve the magnets 14 and to make them even less sensible to the impacts and vibrations. The magnets 14 have good resistance to the centrifugal force, thanks to the retention device 17. The central part 19 and the first 30 and second 40 retention means eliminate the gaps caused by the production tolerances of the receptacles 9 and the magnets 14.

It will be appreciated that the presence of the device 17 for retention of the magnets makes it possible to improve the radial strength of the magnets without movement of the latter, despite the production tolerances.

It is understood that persons skilled in the art will be able to make modifications to the different forms of the body 3 of the rotor 1 and of the retention devices 17 described in the figures, without departing from the context of the invention.

Alternatively, the retention device 17 can also comprise a second part, which is designed to be placed axially between the magnet 14 and the base of the receptacle 9 (the receptacle 9 then being closed at one of its axial ends). A retention flange can make it possible to ensure the axial closure of the open end of the receptacle 9 inside which the magnet 14 and its retention device 17 are positioned.

According to an embodiment of the invention, the retention device 17 has contact with the projecting portion 41 along the entire receptacle 9, according to the axis X.

This retention flange then forms an end base of the receptacle 9. It ensures balancing of the rotor 1, whilst permitting good retention of the magnet 14 inside its receptacle 9. This flange is made of a non-magnetic material with high mechanical strength. The flange can be made of aluminium. Alternatively, the receptacle 9 opens out, and has two end flanges at each of the axial ends of the receptacle 9.

The at least one element in the form of a permanent magnet 14 is retained radially and axially inside the receptacle 9, between the inner axial part 91a of the receptacle 9, and the inner axial face 15 of the magnet 14. As shown in FIGS. 1 to 4, the inner axial part 91a of the receptacle 9 comprises two concave portions 42 and a projecting portion 41, which extends axially according to the axis X. The projecting portion 41 is closer to the face 15 of the magnet than the two concave portions 42.

According to the invention, the recesses 5 are provided in the body 3, and are positioned between the receptacles 9, on a trajectory which connects in succession the projecting portions 41 of the consecutive receptacles 9, preferably according to a section which intersects perpendicularly the axis X of the rotor 1. The recesses 5 are positioned between the receptacles 9, and are provided in the body 3, according to the same radial distance as the inner axial part 91a of the receptacle 9. Recess 5 in this case means a passage which is free of material, even in the state in which the rotor 1 is functioning. In this respect, a receptacle for incorporation of a securing means is not a recess in the sense of the present application.

According to one embodiment, the trajectory is circular, and has as its centre the point O, the point O being at the intersection between the axis X of the rotor 1 and the said section which intersects the axis X of the rotor 1 perpendicularly.

According to another embodiment of the invention, the trajectory extends according to a maximum length L of the recess. In this case, maximum length L of the recess means the length of the recess 5 which extends substantially perpendicularly to a radial direction $D_R$, which has as its origin the point O and passes via the middle of this length L, thus connecting two ends of the recess 5.

According to one embodiment, the concave portions 42 have outer contours formed by lines 43 in the form of an arc of a circle. These lines 43 in the form of an arc of a circle of the outer contours of the concave portions 42 preferably have a common centre of a circle.

According to a variant, the centre of the circle (which in this case means the centre of the lines 43 in the form of an arc of a circle) is contained on a plane which passes via the axis X, and is contained radially in the receptacle 9; this plane which passes via the axis X is contained radially in the receptacle 9.

FIGS. 1 and 2 represent a preferred embodiment in which the radius of curvature of the lines 43 in the form of an arc of a circle is substantially half a width l of the receptacle 9. This arrangement is also found in FIG. 3, which represents half of the receptacle 9 (cut according to its width l, see FIG. 3).

The recess 5 has a form which is polygonal, circular, elliptical, or a combination of the aforementioned forms. Conventionally, this recess 5 has a polygonal form. According to an embodiment of the invention, the recess 5 has two first sides 51, each of these first sides 51 extending substantially parallel to a radial face 91c of the closest receptacle 9. As can be seen in FIG. 3, the first side 51 is radially at the same distance from the axis X of the rotor 1 as the inner axial part 91a. The concave portion 41 is at the same radial distance from the axis X as a portion of the first side 51, such that a thickness e is defined between the first side 51 of the recess 5 and the concave portion 42. The concave portion 42 of the receptacle 9 then extends radially towards the exterior of the rotor 1, in order to form the radial face 91c of the receptacle 9. This radial face 91c of the receptacle 9 can comprise a recessed portion 92 which extends according to the axis X, and is arranged at the intersection of a radial face 91c of the receptacle 9 and the outer axial part 91a of the receptacle 9.

In general, this thickness e contained between the recess 5 and the receptacle 9 must be thick enough to ensure good mechanical strength of the magnet 14, but it must also be thin in order to prevent the magnetic leakage paths. The arrangement of the recess 5 in order to channel the magnetic fluxes detracts from the mechanical strength of the body 3, but a part of the stresses is advantageously transferred to the magnet 14, such that the forces are transferred globally radially from the inner axial part 91a to the outer axial part 91b; by this means, offsetting of part of the forces to the projecting portion 41 and the magnet makes it possible to reduce the thickness contained between the recess 5 and the receptacle 9, such as to minimise the magnetic flux leakage paths.

When the recesses 5 have a form obtained from the combination of a form in the shape of a triangle and a form in the shape of a trapezium, fourth sides 52 of the form in the shape of a triangle adjacent to the first non-parallel sides 51 of the form in the shape of a trapezium define an angle α of between 90° and 180° relative to the first sides 51 which are respectively adjacent to them.

As can be seen in FIGS. 2 and 3, the projecting portion 41 can preferably have a first facet 411 with a middle M which defines the centre of the lines 43 in the form of an arc of a circle. In a variant, the radial face 91c of the receptacle 9 is substantially orthogonal to the first facet 411 of the projecting portion 41.

FIG. 6 shows an embodiment in which the projecting portion 41 is contained between first ridges which separate the said projecting portion 41 from the two concave portions 42, the said two concave portions 42 being contained between these first ridges and second ridges which separate the concave portions 42 from the radial faces 91c of the receptacle 9. As can be seen in FIG. 3, the second ridges are radially at the same distance from the axis X as a portion of the first side 51.

According to another embodiment, following the section which intersects the axis X of the rotor 1 perpendicularly, the first facet 411 extends parallel to the retention device 17, and second and third parallel facets 412 of the projecting portion 41 which are parallel to one another are connected to the concave portion 42 in the location of the said first ridges.

As can be seen in FIG. 4, thanks to the projecting portion 41, part of the forces is transferred to the magnet 14, such as to reduce the forces in the body of the rotor 1, in particular in the location of the thickness e contained between the receptacle 9 and the recess 5. By comparing the data in FIGS. 4 and 5 which show the displacements of material in millimeters in the rotor 1 it is found that the values are significantly less high in the rotor 1 in FIG. 4 (according to the invention) and the rotor in FIG. 5. In particular, in the location of the thickness e of the rotor in FIG. 4, the displacement is 0.005498 mm, whereas in the location of the thickness e of the rotor in FIG. 5, the displacements are contained between 0.00632 mm and 0.00947 mm. It is deduced from the value of the displacements that the distribution of the stresses for the rotor in FIG. 4 according to the invention is more advantageous than for the rotor in FIG. 5. Ultimately, the projecting portion 41 reduces the concentration of the stresses in the location of the thickness e.

The invention claimed is:

1. Rotor (1) with permanent magnets comprising:
a set of plates forming the body (3) of the rotor (1) with an axis (X);
receptacles (9) which are spaced regularly around the circumference of the rotor (1), and situated in the body (3) of the rotor (1), some of which receive at least one element in the form of a permanent magnet (14) which is retained axially inside the receptacle (9), between an inner axial part (91a) of the receptacle and an outer axial part (91b), said inner axial part (91a) of the receptacle comprising two concave portions (42) and a projecting portion (41) which extend axially according to the axis (X), said projecting portion (41) being radially closer to the inner axial face (15) of the magnet (14) than the two concave portions,
wherein recesses (5) are provided in the body (3), and positioned between the receptacles (9) on a trajectory which connects in succession the projecting portions (41) of the consecutive receptacles (9), and in that the magnet is retained radially and axially by means of a retention device (17) which extends axially inside the receptacle (9), between the inner axial part of the receptacle and said axial face (15) of the magnet (14).

2. Rotor (1) with permanent magnets according to claim 1, wherein the concave portions (42) have outer contours formed by lines (43) in the form of an arc of a circle.

3. Rotor (1) with permanent magnets according to claim 2, wherein the projecting portion (41) has a first facet (411) with a middle (M) which defines the centre of the lines (43) in the form of an arc of a circle.

4. Rotor (1) with permanent magnets according to claim 2, wherein the lines (43) in the form of an arc of a circle of the outer contours of the concave portions (42) have a common centre of a circle.

5. Rotor (1) with permanent magnets according to claim 2, wherein the centre of the circle is contained on a plane which passes via the axis (X), and is contained radially in the receptacle (9).

6. Rotor (1) with permanent magnets according to claim 2, wherein the radius of curvature of the lines (43) in the form of an arc of a circle is substantially equal to half a width (1) of the receptacle (9).

7. Rotor (1) with permanent magnets according to claim 1, wherein the recess (5) has two first sides (51), each of these first sides (51) extending substantially parallel to a radial face (91c) of the closest receptacle (9).

8. Rotor (1) with permanent magnets according to claim 1, wherein the thickness (e) contained between the radial face (91c) of a receptacle (9) and the side (51) of a following recess is thinned in order to limit the magnetic leakage paths.

9. Rotor (1) with permanent magnets according to claim 3, wherein said radial face (91c) is substantially orthogonal to the first facet (411) of the projecting portion.

10. Rotor (1) with permanent magnets according to claim 1, wherein said trajectory is circular, and has as its centre the point O, the point O being at the intersection between the axis (X) of the rotor (1) and said section which intersects the axis (X) of the rotor (1) perpendicularly.

11. Rotor (1) with permanent magnets according to claim 1, wherein said trajectory extends according to a maximum length (L) of the recess (5).

12. Rotor (1) with permanent magnets according to claim 1, wherein the recesses (5) have a form which is obtained from the combination of a form in the shape of a triangle and a form in the shape of a trapezium.

13. Rotor (1) with permanent magnets according to claim 12, wherein fourth sides of the form in the shape of a triangle adjacent to two first non-parallel sides (51) of the form in the shape of a trapezium define an angle (α) of between 90° and 180° relative to the first sides (51) which are respectively adjacent to them.

14. Rotor (1) with permanent magnets according to claim 1, wherein a recessed portion (92) which extends according to the axis (X) is provided at the intersection of a radial face (91c) of the receptacle (9) and an outer axial part of the receptacle (9).

15. Rotor (1) with permanent magnets according to claim 1, wherein the retention device (17) has contact with the projecting portion (41) along the entire receptacle (9), according to the axis (X).

16. Rotor (1) with permanent magnets according to claim 1, wherein the projecting portion (41) is contained between first ridges which separate said projecting portion (41) from the two concave portions (42), said two concave portions (42) being contained between these first ridges and second ridges which separate the concave portions (42) from the radial faces of the receptacle (9).

17. Rotor (1) with permanent magnets according to claim 13 wherein along a section which intersects the axis (X) of the rotor (1) perpendicularly, the first facet (411) extends parallel to the retention device (17), and second and third facets (412) which are parallel to one another are connected to the concave portion (42) in the location of the said first ridges (43).

18. Rotor (1) with permanent magnets according to claim 1, wherein the receptacle (9) has a contour which is closed according to a section which intersects the axis (X) of the rotor (1) perpendicularly.

19. Rotor (1) with permanent magnets according to claim 1, wherein the recesses (5) are provided in the body (3), and are positioned between the receptacles (9) along a trajectory which connects in succession the projecting portions (41) of the consecutive receptacles (9), according to a section which intersects the axis (X) of the rotor (1) perpendicularly.

20. Alternator comprising a rotor (1) according to claim 1.

* * * * *